United States Patent [19]

Clark, Jr.

[11] 4,270,127
[45] May 26, 1981

[54] DIGITAL DATA COMPRESSION CIRCUIT

[75] Inventor: Charles A. Clark, Jr., Chatsworth, Calif.

[73] Assignee: RCA Corporation, New York, N.Y.

[21] Appl. No.: 52,416

[22] Filed: Jun. 27, 1979

[51] Int. Cl.³ ............................................. G01S 13/95
[52] U.S. Cl. ................................................... 343/5 W
[58] Field of Search ..................................... 343/5 W

[56] References Cited
U.S. PATENT DOCUMENTS

| | | | |
|---|---|---|---|
| 3,050,723 | 8/1962 | Atlas | 343/5 W X |
| 4,038,655 | 7/1977 | Clark, Jr. et al. | 343/5 W |
| 4,092,644 | 5/1978 | Hodge | 343/5 W |

Primary Examiner—T. H. Tubbesing
Attorney, Agent, or Firm—Samuel Cohen; Robert L. Troike; Raymond E. Smiley

[57] ABSTRACT

An airborne weather radar system displays on a display screen a weather map in the form of a matrix of spots of intensity with N possible intensity levels ranging from a lowest level to a highest level where $N > 2$ and where the intensity levels correspond to respective data signals provided by the radar system. The intensity control on the weather radar system is operator controllable to cause data signals corresponding to all intensity levels except the lowest to be converted to signals corresponding to the highest level. Therefore, only the highest and lowest intensity levels are displayed.

4 Claims, 1 Drawing Figure

TABLE I

| | ROM 30 | | | | SCREEN 52 |
|---|---|---|---|---|---|
| | INPUT | | OUTPUT | | INTENSITY |
| C | 2¹ | 2⁰ | 2¹ | 2⁰ | LEVEL |
| 0 | 0 | 0 | 0 | 0 | "0" |
| 0 | 0 | 1 | 0 | 1 | "1" |
| 0 | 1 | 0 | 1 | 0 | "2" |
| 0 | 1 | 1 | 1 | 1 | "3" |
| 1 | 0 | 0 | 0 | 0 | "0" |
| 1 | 0 | 1 | 1 | 1 | "3" |
| 1 | 1 | 0 | 1 | 1 | "3" |
| 1 | 1 | 1 | 1 | 1 | "3" |

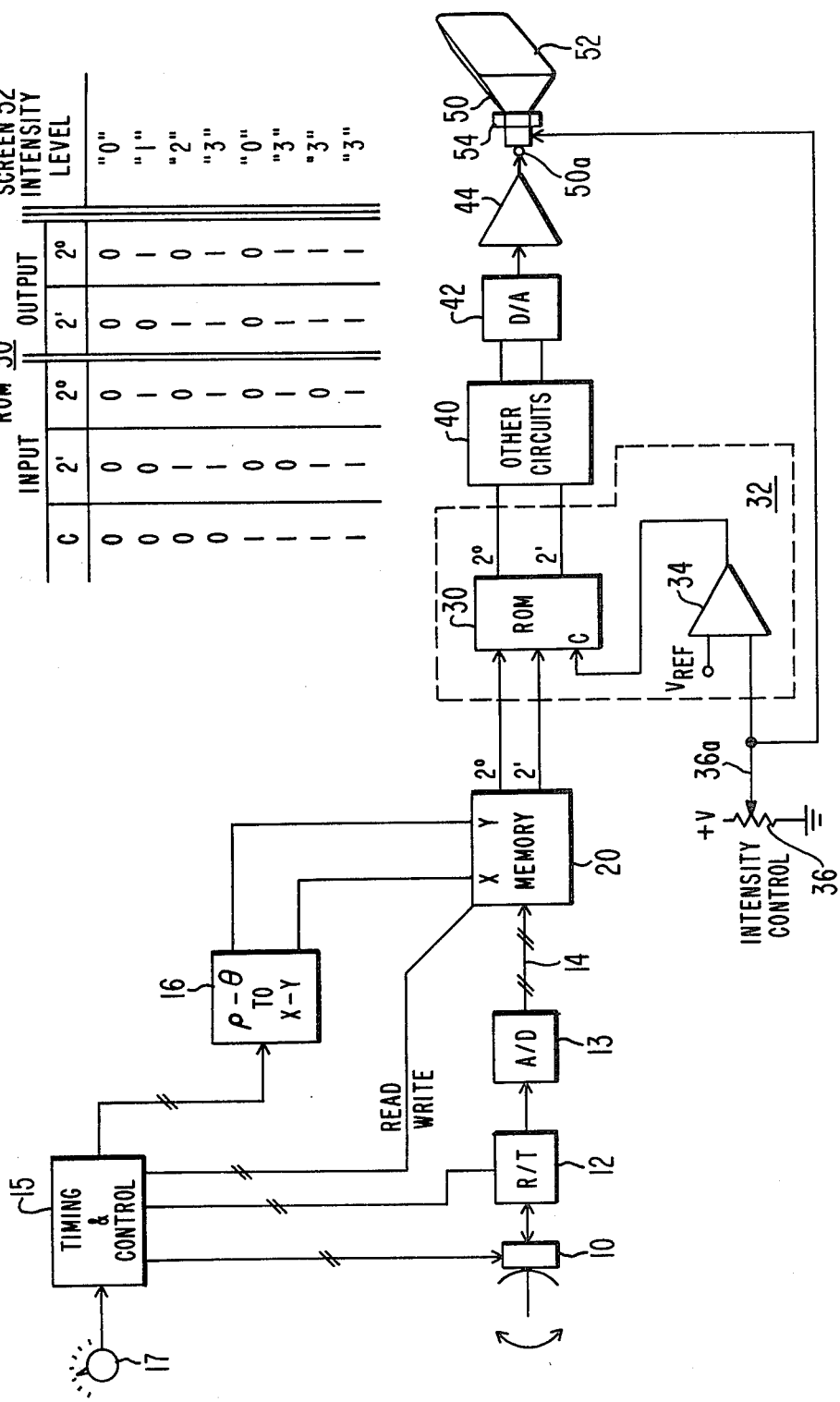

DIGITAL DATA COMPRESSION CIRCUIT

In digital airborne weather radar systems a cathode ray tube is utilized to display a weather "map" corresponding to the precipitation pattern in front of the aircraft in which the system is mounted. The map is composed of a matrix of spots or "pixels" each corresponding to a particular azimuth and range position in front of the aircraft. In color radar systems each pixel is one of a plurality of colors where each color represents a different rate of precipitation. There is included one color indicating no or little precipitation.

In monochromatic weather radars each spot or pixel is in one of a plurality N, such as four, of levels of screen intensity or brightness representing different rates of precipitation where one level represents no precipitation. The different levels are given numbers. Thus, for example, a "0" level (black screen) indicates less than 1.0 mm/hr.; a "1" level (first screen intensity level) may correspond to 1.0–4.0 mm/hr.; a "2" level (higher screen intensity than a "1") may correspond to 4.0–11.5 mm/hr.; and a "3" level (higher than a level "2" screen intensity) may correspond to 11.5 mm/hr. or more of rainfall.

The ability to discriminate between rainfall rates is important in choosing the safest route through a storm.

In a bright aircraft cockpit it is much easier to discern the presence of a "3" level than a "2" or "1" level due to the increased intensity of the "3" level. However, if only the single "3" level intensity were displayed for all rainfall rates above, for example, 1 mm/hr., which would make visibility easier, the ability to detect separate rainfall rates would be lost. This invention provides a means for achieving increased display visibility without giving up the separate rainfall rate display capability.

In accordance with the present invention a means produces a succession of data signals to be displayed on a screen, each data signal being one of a plurality of at least three values ranging from a lowest value to a highest value, each value corresponding to a different one of N display intensity levels. An operator controlled means selectively produces a control signal. A means is responsive to the control signal and to the succession of data signals for converting signals of intermediate values to the highest value such that less than N intensity levels are displayed.

The sole FIGURE is a weather radar system in block diagram form incorporating a digital data compression circuit in accordance with the present invention.

With reference to the FIGURE, a digital airborne weather radar system is shown in elementary block diagram form. Such a radar is described in more detail in U.S. Pat. No. 4,106,021 issued Aug. 8, 1978 to K. Katagi and in U.S. Pat. No. 4,127,873 issued November 1978 to K. Katagi. Both patents are assigned to the assignee of the present application and are incorporated by reference into the present specification. The system of the FIGURE includes a sector scan transmitting and receiving antenna 10, a receiver/transmitter (R/T) 12 and an analog-to-digital converter (A/D) 13 all of conventional design and operation. Antenna 10, R/T 12 and A/D 13 may, for example, be of the type exemplified by the model PriMUS 20 manufactured and sold by the RCA Corporation, Van Nuys, Calif.

A timing and control circuit (T/C) 15 is coupled to a control input terminal of each of antenna 10, R/T 12 and rho-theta-to-X-Y converter 16 of the type described in the aforementioned U.S. Pat. No. 4,106,021. A rotatable switch 17 coupled to T/C 15 is set by the radar operator to indicate the maximum range of interest to the operator. Components 10, 12, 13, 15 and 17 operate together to produce serially at multiconductor cable 14 (all multiconductor cables such as 14 are so indicated by slash marks) multibit signals representing radar return amplitudes serially at successive range positions (distances) from antenna 10 at a given angle or azimuth position and then serially at successive range positions at an adjacent azimuth position, etc.

Typical maximum ranges are from a few miles to a few hundred miles as determined by the setting of switch 17. Typical sectors of azimuth positions are from 90° to 180°. Such a format is commonly called a rho-theta format or plan position indicator (PPI) format. Thus, for example, A/D 13 may produce a succession of two bit data signals each of a value representing one of four different levels ("0", "1", "2" or "3") of meteorological conditions ranging from a clear sky or very little precipitation (level "0") to a dense storm cell (level "3") at successive ranges from antenna 10.

Some digital radar systems employ a cathode ray tube (CRT) display which presents information in the aforementioned rho-theta format. That is, the presentation appears as spokes of a wheel radiating from a common origin representing the position of antenna 10. In the present exemplanary radar system however the presentation is in the form of a raster scan (i.e., parallel lines of information with each line containing a plurality of display elements). Accordingly, cable 14 is coupled to the information lines of memory device 20 while converter 16 is coupled to the X and Y address lines thereof. Since T/C 15 generates command signals to position antenna 10, it continually tracks the angular position of the antenna. Further, since T/C 15 generates radar transmitter pulses via R/T 12 to antenna 10 and since the propagation rate of the radar waves in free space is known T/C 15 continually tracks the radial distance from antenna 10 from which return signals to the antenna have come. Thus, T/C 15 continually tracks the range and azimuth from which signals appearing on line 14 have come. Therefore, converter 16, under control of T/C 15, converts the coordinates of each digital signal emitting from A/D 13 at a given azimuth or angle and at a given distance therealong from the antenna 10 to the equivalent horizontal (X) and vertical (Y) distances from some reference point, thereby providing a storage address location to memory 20 into which is written data produced by A/D 13.

Memory 20 may store data signals received from A/D 13 functionally in the form of a two dimensional matrix of rows and columns of information termed data cells. There may be, for example, capacity for 128 columns of data cells each column consisting of 128 data cells arranged in 128 rows which will provide the basis of one frame of information to be displayed on a display device 50. Each data cell is at one of at least three values and is typically one of four values stored as a two bit signal. It will be appreciated by those knowledgeable with various types of suitable memories 20 that the actual storage may not be in the form of rows and columns but for purposes of description of the apparatus in the FIGURE storage in the form of successively numbered columns and rows will be assumed.

Memory 20, hereinafter assumed to store two bit data signals, is coupled via a $2^0$ line and a $2^1$ line to a read only memory (ROM) 30 which is part of a digital data compression circuit 32. Also coupled to the C or control terminal of ROM 30 is a comparator circuit 34 of conventional design. Comparator circuit 34 receives at one input terminal a reference voltage $V_{REF}$ and at the other input terminal a signal indicative of the setting of brightness control potentiometer 36. Intensity control 36 is adapted to receive a source of potential $+V$ which is greater than $V_{REF}$. Intensity control 36 is also coupled to CRT display 50 for controlling the overall brightness of the display in the same manner as the brightness control operates in a standard television receiver.

When the intensity control 36 is turned "up" sufficiently so that the voltage on arm 36a thereof is greater than a preselected value $V_{REF}$, comparator 34 produces a logic 1 signal. Otherwise comparator 34 produces a logic 0 signal. ROM 30 acts in accordance with truth table I. It will be noted from Table I that when a logic 0 is applied to the C terminal of ROM 30 the ROM simply acts to pass through those bits which it receives on the $2^0$ and $2^1$ lines. No alteration of those bits occurs. However, when ROM 30 receives a logic 1 signal at its C input terminal, all bit combinations other than $2^1=0$ and $2^0=0$ will be converted to produce an output signal of value corresponding to a "3" level that is, with $2^1=1$ and $2^0=1$ regardless of the input to the ROM. ROM 30 is coupled to other circuits 40 such as, for example, the resolution enhancement circuit (Reference No. 80, FIG. 1) of the aforementioned U.S. Pat. No. 4,127,873.

Circuits 40 are coupled to a digital-to-analog converter (D/A) 42 which converts two bit signals thereat to an eqivalent analog signal which is amplified by amplifier 44 to produce signals having appropriate parameters for application to video input terminal 50a of display device 50.

Display device 50 typically may be a CRT of the type used in television receivers and may have a suitable viewing screen 52 on which lines of information are traced by an electron beam (not shown) at positions on viewing screen 52 determined by signals (not shown) applied to deflection yoke means 54 all in conventional manner. The luminane of points along each line of information are determined in accordance with signals applied at terminal 50a. In accordance with one exemplanary radar, the aforementioned PriMUS 20, scan lines extend vertically from bottom to top of screen 52 and successive scan lines are traced to the right of preceding scan lines. There are two such fields of interlaced scan lines in one frame as in a conventional television set. Each scan line is comprised of a plurality of pixels as previously described. Each pixel will be at one of four levels of brightness (the first level of "brightness," level "0" is a dark screen) as determined by signals applied at terminal 50a as a function of time. In turn, the signals applied at terminal 50a are a function of signals produced by ROM 30.

In operation, antenna 10 is successively pivoted to different angular positions. At each angular position T/C 15 causes R/T 12 to produce a radio frequency pulse which is emitted by antenna 10. The reflected return signal to antenna 10 from the atmosphere is detected and amplified by R/T 12, digitized by A/D 13 into a succession of two bit signals each indicative of a level of precipitation (if any) at different distances from antenna 10 and stored in memory 20 in addresses determined by rho-theta-to-X-Y converter 16 all as described in the aforementioned U.S. Pat. No. 4,106,021.

Independent of the rate at which data signals are passed into memory 20 they are serially read out of memory 20 under control of T/C 15 at a rate required for refresh of CRT screen 52. When intensity control 36 is adjusted to produce normal levels of brightness on screen 52 and thus comparator 34 is producing a logic 0, ROM 30 is transparent to signals received thereat simply passing unaltered to other circuits 40 whatever two bit signals it receives. Each of the two bit signals is converted to one of four analog values by D/A 42 and displayed as one of four levels of brightness at a location on screen 52, successive two bit signals from memory 20 being displayed at successive locations on screen 52. As indicated by the right-most column of Table I the levels are "0", "1", "2", and "3." Level "0" corresponds to a black spot or pixel on screen 52. Level "3" corresponds to a bright spot on screen 52 and levels "1" and "2" correspond to intermediate brightness levels.

If the operator decides to increase the general level of brightness or intensity of the display on screen 52, the intensity control 36 is operated to increase the level of brightness of all of levels "1", "2" and "3." (Level "0" remains black). Conversely, if the intensity control 36 is turned "down" all intensity levels "1", "2" and "3" of pixels appearing on screen 52 are correspondingly decreased in value.

As brightness control 36 is turned up sufficiently the voltage level at arm 36a will eventually exceed that of $V_{REF}$ at which time comparator 34 will produce a logic "1" which is applied to ROM 30. As indicated in Table I, when terminal C is receiving a logic 1 signal, all two bits signals except those representing level "0," (i.e., $2^1=0$ and $2^0=0$) are converted by ROM 30 into an output signal representing a level "3," (i.e., $2^1=1$, $2^0=1$). It will be noted from Table I that there are no intermediate brightness levels. The level "0" corresponding to $2^1=0$, $2^0=0$ remains as is. The former levels "1" and "2" are converted to a level "3" thus on display screen 52 the pattern will typically consist of black areas representing precipitation below 1.0 mm/hr. and areas of full brightness representing precipitation above 1.0 mm/hr.

It will be understood that rather than having a comparator 34, a simple switch could be connected to the C terminal of ROM 30 having one position producing a logic 0 and having another position producing a logic 1 to cause the change of levels as abovedescribed. Further, any means which is capable of converting signals from one value to another may be substituted for ROM 30 such as conventional logic gates. Bits of the data signals may be produced by memory 20 in succession rather than in parallel requiring appropriate circuitry 30. For parallel bits, however, ROM 30 is convenient in that it creates the same delay in both $2^0$ and $2^1$ signals passing therethrough so that no timing problems are created beyond ROM 30. Further, the system is not necessarily limited to four levels but could operate with three levels or more. For example, in a system with 8 levels numbered "0" through "7" ROM 30 may be programmed to change X levels such as levels "2" through "6" to level "7" while leaving unaltered level "1" or perhaps changing it to level "0" where $0 < X \leq (N-2)$.

I claim:

1. In a radar system of the type including means for receiving echo signals from targets in a searched space and means for producing from the received echo signals, digitally formated data representative of the searched space, the improvement comprising:

multiple state conversion means responsive to a control signal for determining the state thereof and including circuit means and display means for converting said digitally formated data into different visible light patterns in accordance with the state of said conversion means; and settable means producing a signal the value of which determines the overall intensity of said visible light patterns, said settable means also providing said control signal for determining the state of said conversion means depending on the setting of said settable means;

said conversion means, when in a first state, converting said data into a light pattern wherein all target magnitudes below a predetermined magnitude $M_L$ are represented as dark areas and all target magnitudes greater than $M_L$ are represented as light areas of varying intensities corresponding to a parameter of said targets;

said conversion means, when in a second state, converting said data into a light pattern wherein all target magnitudes below said predetermined magnitude $M_L$ are represented as dark areas and all target magnitudes greater than $M_L$ are represented as light areas of a single intensity.

2. The combination as set forth in claim 1, wherein said settable means comprises a comparator having a first input terminal adapted to receive a reference voltage and having a second input terminal adapted to receive an operator settable voltage which can be set to be less than or greater than said reference voltage for causing said conversion means to be in said first state or said second state.

3. The combination as set forth in claim 1, wherein said conversion means comprises a read only memory.

4. The combination as set forth in claim 1, wherein said conversion means comprises means for converting said digitally formated data to analog signals and means responsive to said analog signals for producing said light pattern.

* * * * *